(12) United States Patent
Plumley

(10) Patent No.: US 8,322,085 B2
(45) Date of Patent: Dec. 4, 2012

(54) STRUCTURE TO PROTECT OCCUPANTS FROM STORM DEBRIS

(76) Inventor: Roger Dale Plumley, Crab Orchard, WV (US)

( * ) Notice: Subject to any disclaimer, the term of this patent is extended or adjusted under 35 U.S.C. 154(b) by 0 days.

(21) Appl. No.: 12/931,979

(22) Filed: Feb. 16, 2011

(65) Prior Publication Data

US 2011/0138701 A1 Jun. 16, 2011

Related U.S. Application Data

(63) Continuation-in-part of application No. 12/283,258, filed on Sep. 11, 2008, now abandoned.

(51) Int. Cl.
*E04H 9/00* (2006.01)
(52) U.S. Cl. ..... 52/79.14; 52/425; 52/169.6; 52/742.14; 52/79.1
(58) Field of Classification Search .............. 52/79.11, 52/421, 79.1, 127.3, 302.1, 425, 426, 169.6, 52/742.14; 109/1 S
See application file for complete search history.

(56) References Cited

U.S. PATENT DOCUMENTS

| | | | | |
|---|---|---|---|---|
| 1,617,033 | A * | 2/1927 | Shields | 52/423 |
| 3,315,424 | A * | 4/1967 | Smith | 52/206 |
| 3,751,864 | A * | 8/1973 | Berger et al. | 52/79.11 |
| 4,126,972 | A * | 11/1978 | Silen | 52/34 |
| 4,958,976 | A * | 9/1990 | Haueter | 414/331.01 |
| 5,109,779 | A * | 5/1992 | Maroist | 109/33 |
| 5,553,430 | A * | 9/1996 | Majnaric et al. | 52/236.8 |
| 5,813,174 | A * | 9/1998 | Waller | 52/79.1 |
| 6,085,475 | A * | 7/2000 | Parks et al. | 52/169.6 |
| 6,145,263 | A * | 11/2000 | Eckerd | 52/508 |
| 6,161,345 | A * | 12/2000 | Hope et al. | 52/169.6 |
| 6,308,466 | B1 * | 10/2001 | Moriarty | 52/79.5 |
| 6,389,761 | B1 * | 5/2002 | McKinnon | 52/167.3 |
| 6,393,776 | B1 * | 5/2002 | Waller et al. | 52/169.6 |
| 6,412,231 | B1 * | 7/2002 | Palatin | 52/79.1 |
| 6,415,557 | B1 * | 7/2002 | McCalley | 52/79.1 |
| 6,415,558 | B1 * | 7/2002 | Cherry | 52/79.1 |
| 6,438,906 | B1 * | 8/2002 | Komarowski et al. | 52/169.1 |
| 6,530,553 | B1 * | 3/2003 | Diorio et al. | 249/27 |
| 7,458,305 | B1 * | 12/2008 | Horlander et al. | 89/36.01 |
| 7,690,159 | B1 * | 4/2010 | Arnold | 52/167.1 |
| 7,918,056 | B2 * | 4/2011 | Yamaguchi | 52/169.6 |
| 2001/0039770 | A1 * | 11/2001 | Arnold | 52/169.6 |
| 2003/0029131 | A1 * | 2/2003 | Billings et al. | 52/742.14 |
| 2003/0177737 | A1 * | 9/2003 | Byrd | 52/742.14 |
| 2006/0080897 | A1 * | 4/2006 | O'Neal | 52/1 |
| 2006/0143995 | A1 * | 7/2006 | Beal | 52/169.6 |
| 2006/0254165 | A1 * | 11/2006 | Bishop | 52/264 |
| 2007/0022678 | A1 * | 2/2007 | Sempel | 52/169.6 |
| 2007/0044392 | A1 * | 3/2007 | LeBlang | 52/79.11 |
| 2007/0072541 | A1 * | 3/2007 | Daniels et al. | 454/365 |
| 2007/0234651 | A1 * | 10/2007 | Gage | 52/173.2 |
| 2009/0042471 | A1 * | 2/2009 | Cashin et al. | 442/182 |
| 2009/0064604 | A1 * | 3/2009 | Yamaguchi | 52/169.6 |
| 2009/0100786 | A1 * | 4/2009 | Krantz | 52/741.3 |
| 2010/0088974 | A1 * | 4/2010 | Scott, IV | 52/79.5 |
| 2010/0115858 | A1 * | 5/2010 | Olsen | 52/79.1 |
| 2011/0067351 | A1 * | 3/2011 | Rotondo et al. | 52/742.15 |

* cited by examiner

*Primary Examiner* — Robert Canfield
*Assistant Examiner* — Matthew Gitlin

(57) ABSTRACT

A structure to protect occupants from storm debris comprising components that are pre-fabricated and assembled on site. Upon assembly, the void cavities in the floor, walls and ceilings are pumped with concrete to increase the unit strength and stability.

1 Claim, 12 Drawing Sheets

STRUCTURE TO PROTECT OCCUPANTS FROM STORM DEBRIS

The present application is a continuation in part of parent application Ser. No. 12/283,258 filed Sep. 11, 2008 now abandoned.

This invention relates to in-residence storm shelters. The need is addressed by the Federal Emergency Management Agency (FEMA) in publication FEMA 320 (Second Edition, August 1999) as well as various universities and groups. The common recommended method of using common building materials to achieve the desired protection level is by far exceeded with the present invention. The present invention will be packaged as a kit in which the components can be easily handled by 2 people and assembled prior to pumping concrete into the formed voids, (floor, wall and ceiling cavities) rather than the use of common building materials.

BACKGROUND

The weakness encountered at all joints in the common building materials method is overcome by continuously pouring/pumping concrete into floor, wall and ceiling cavities as a continuous concrete fill with no joints whatsoever. The present invention is a 3 ply construction—steel inner ply and steel outer ply with concrete center ply. The wall concrete center ply is significantly thicker than the thickness of a large limestone hollow building block recommended in the common building materials method.

SUMMARY OF INVENTION

It is an object of the present invention to provide a structure to protect the occupants of the structure from debris generated by storms (I.E. tornados, hurricanes, etc.) The intent is to provide a structure that can be assembled in a desired location according to a prescribed method, and then reinforced with concrete fill which upon curing will substantially add to the strength of the structure and also increase the structure's weight, vastly increasing its stability. The structure size can be increased by increasing the quantity of identical floor plates, top plates, wall plates, ceiling plates, etc. . . . described in the drawings. The fasteners discussed here-in are the preferred choice although alternate bolt and nut combinations and/or drilling and tapping of holes will accomplish the same result.

DETAILED DESCRIPTION OF DRAWINGS

Figure 1:
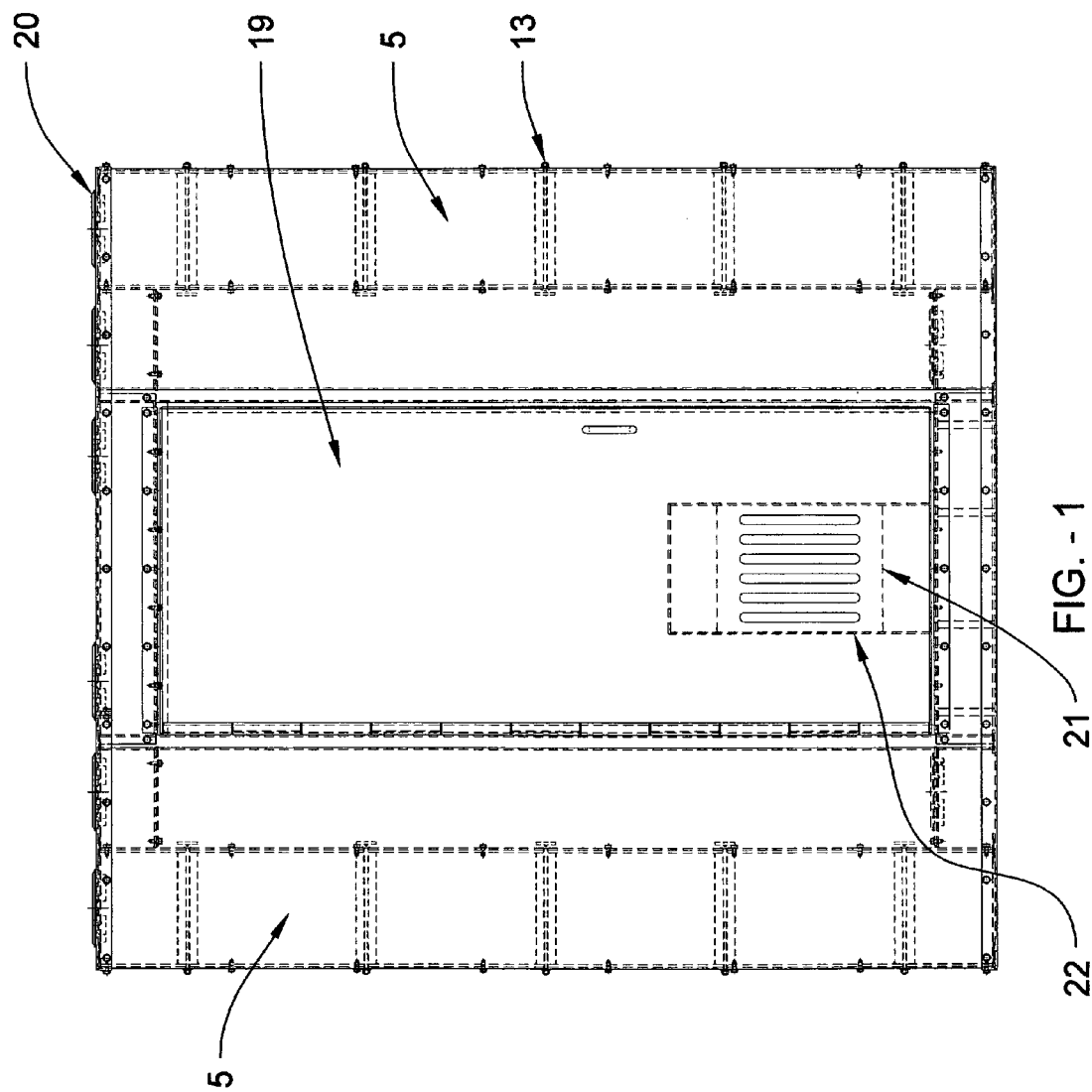
FIG.-1 Orthographic door end view of structure
FIG.-2 Orthographic side view of structure
FIG.-3 Orthographic rear view of structure
FIG.-4 Orthographic top view of structure
FIG.-5 Section view taken at plane 5-5 (see FIG.-4)
FIG.-6 Section view taken at plane 6-6 (see FIG.-5)
FIG.-7 Isometric view—partially assembled
FIG.-8 Isometric view—partially assembled
FIG.-9 Isometric view—partially assembled
FIG.-10 Isometric view—partially assembled
FIG.-11 Isometric view—partially assembled
FIG.-12 Isometric view—completely assembled

FIG.-1 Orthographic Door End View of Structure:
Door (19) is hinge mounted from corner structure (5). Door (19) is provided with ventilation slots and baffle plates (21 & 22) to prevent direct entry of debris into occupant chamber.

Figure 2:
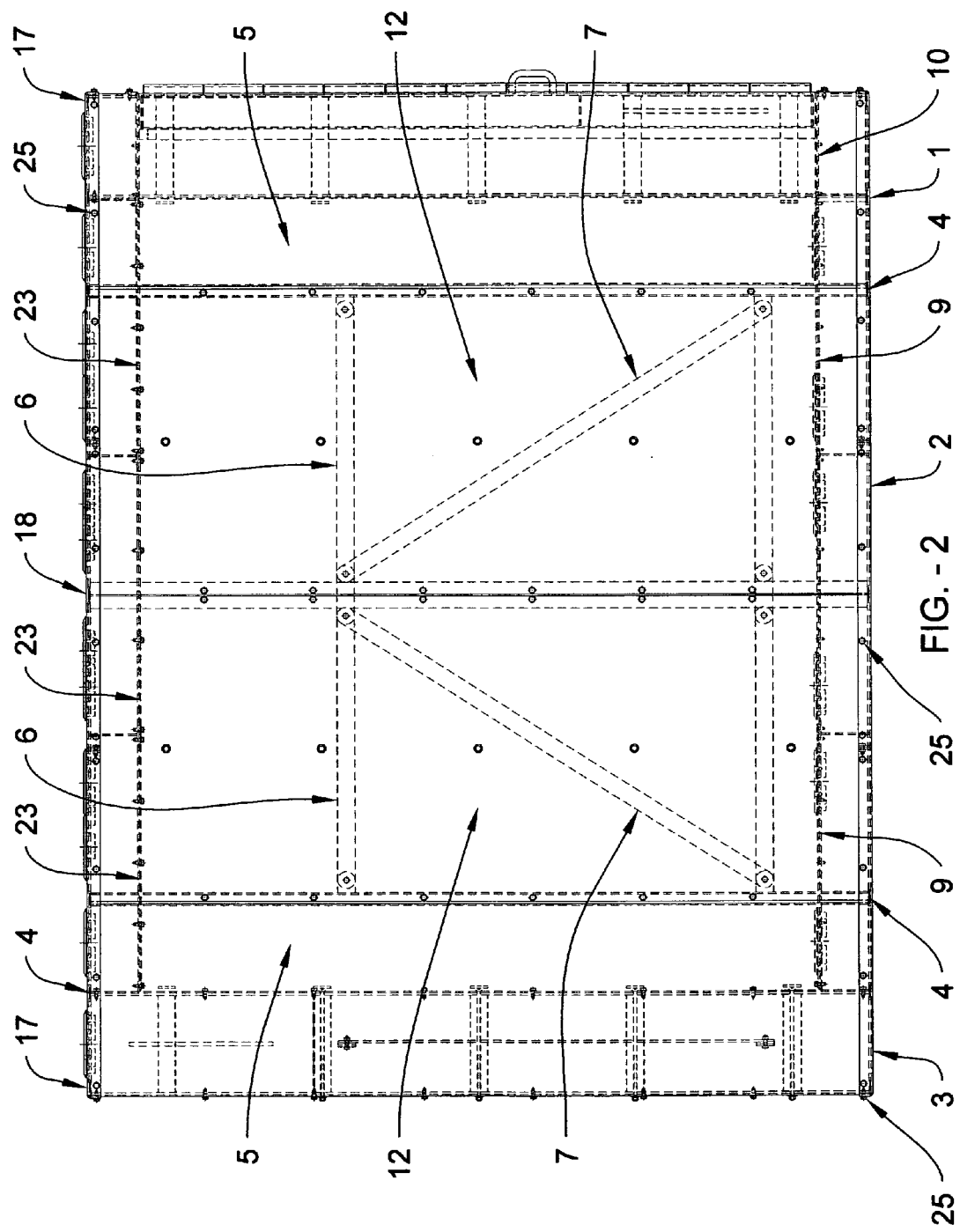

FIG.-2 Orthographic Side View Of Structure:
Corner structure (5) is mounted on base plate weldments (1 & 3) utilizing self threading cap screws (25). Spacer pads (4) are provided to elevate outside corner of plates to prevent interference with radius formed in bent plates. Braces (6 & 7) are provided to align and hold parts in desired location and secured with self threading cap screws (25). Top plates (17 & 18) are mounted on structure utilizing self threading cap screws (25). Top plate (17) and top plate (18) are joined to one another utilizing self threading cap screws (25) on lower surface before ceiling panels (23) are installed.

Figure 3:
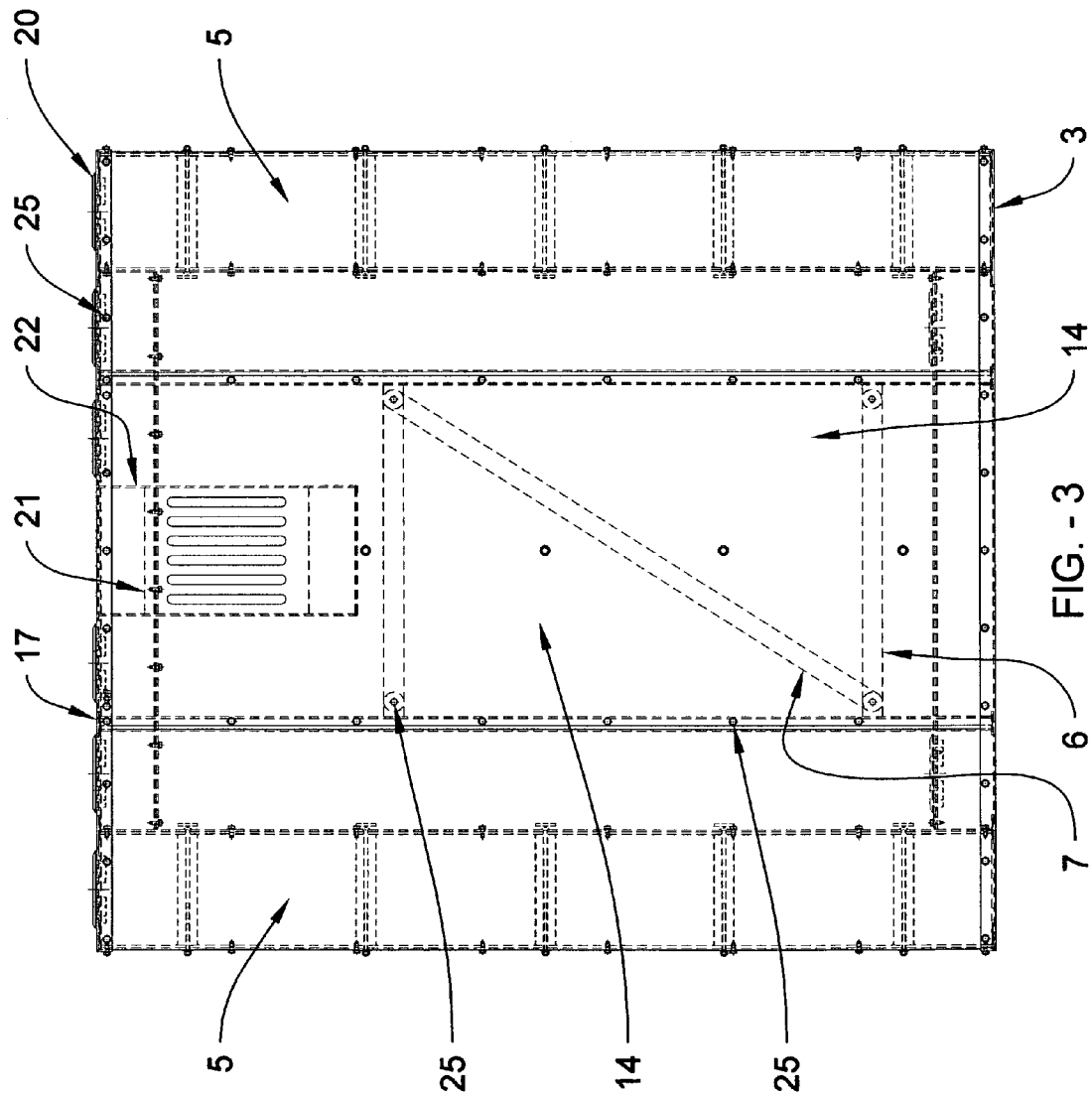

FIG.-3 Orthographic Rear View Of Structure:
Corners (5) are held in proper alignment utilizing braces (6 & 7) and secured to base plates (1 & 3) utilizing self threading cap screws (25). End plate (14) is fastened to corners (5), base plate (3) and top plate (17) utilizing self threading cap screws (25). End plate (14) is provided with ventilation slots and baffle plates (21 & 22) to prevent direct entry of debris into occupant chamber.

Figure 4:
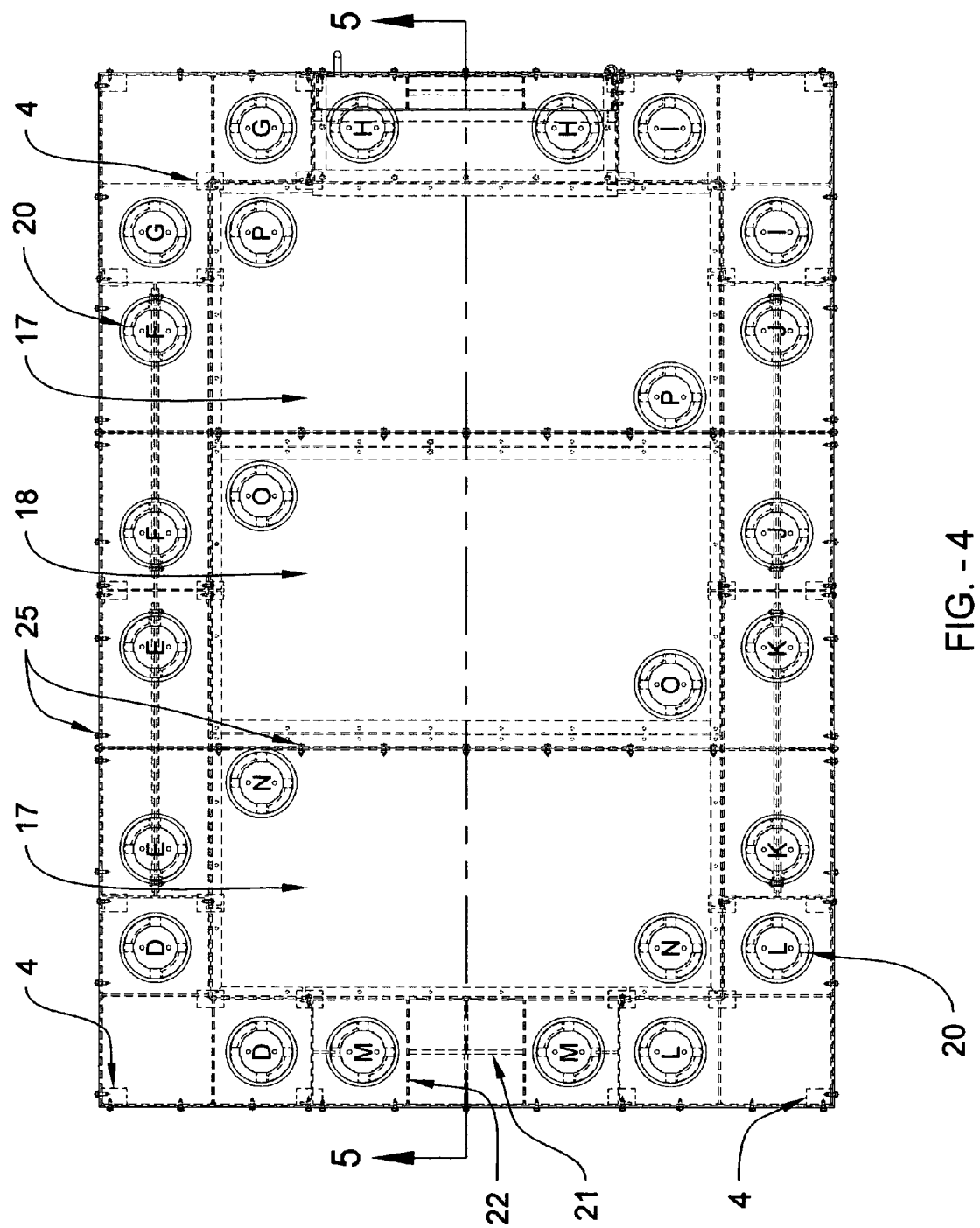

FIG.-4 Orthographic Top View Of Structure:
Top plates (17 & 18) fasten to each other utilizing self threading cap screws (25) and fasten to structure utilizing self threading cap screws (25). Spacer pads (4) are utilized to prevent interference of corners of plates with radius formed in bent plates.

Figure 5:
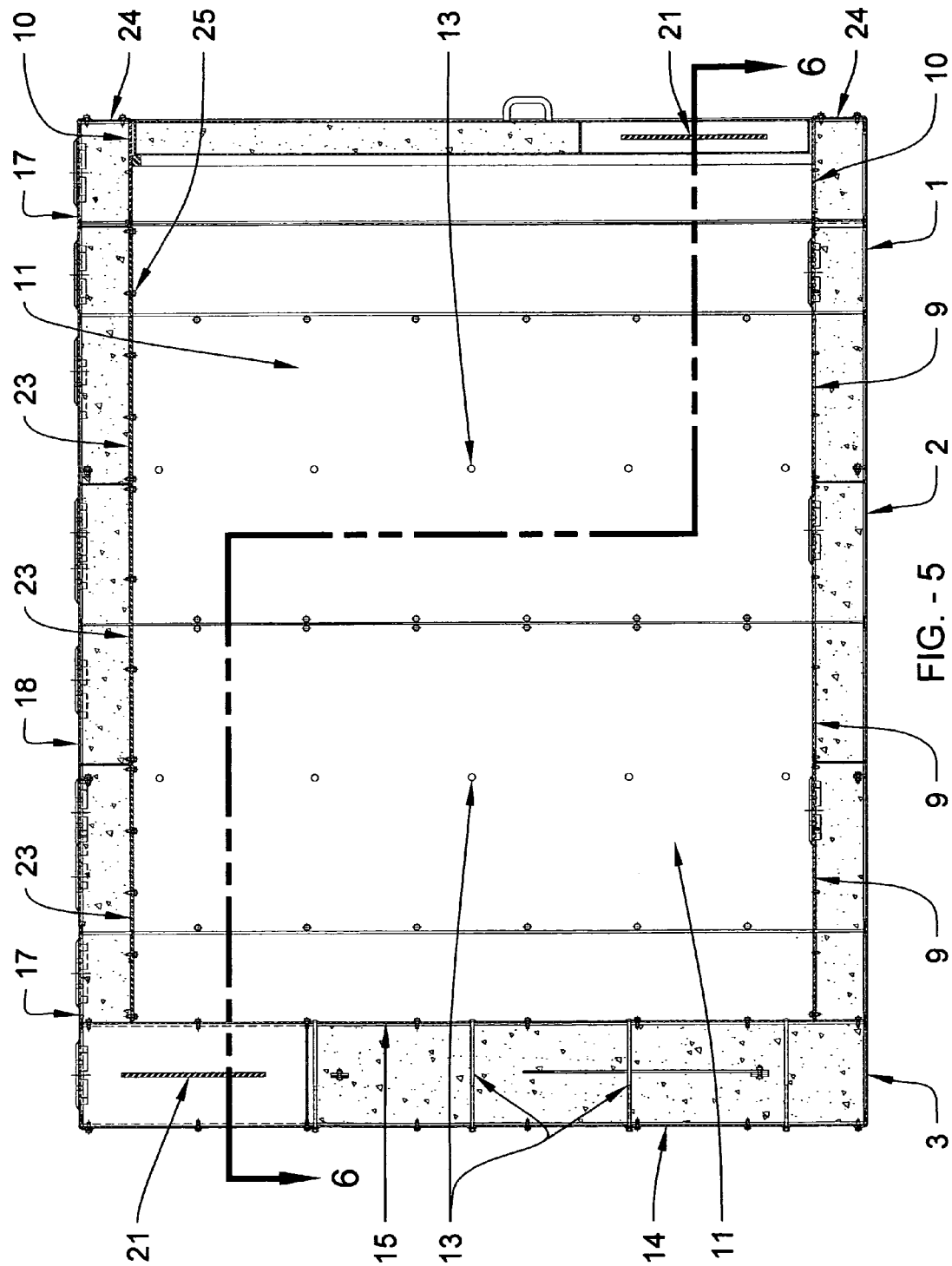

FIG.-5 Section View Taken at Cutting Plane 5-5 (See FIG.-4):
Ceiling plates (23) are fastened to corners (5), wall interior panels (11) and top plates (17 & 18) utilizing self threading cap screws (25). Clearance holes are provided in outside wall plates (12 & 14) and inside plates (11 & 15) to accept tension bolt/nut assembly (13) to minimize plate swellage during concrete filling.

Figure 6:
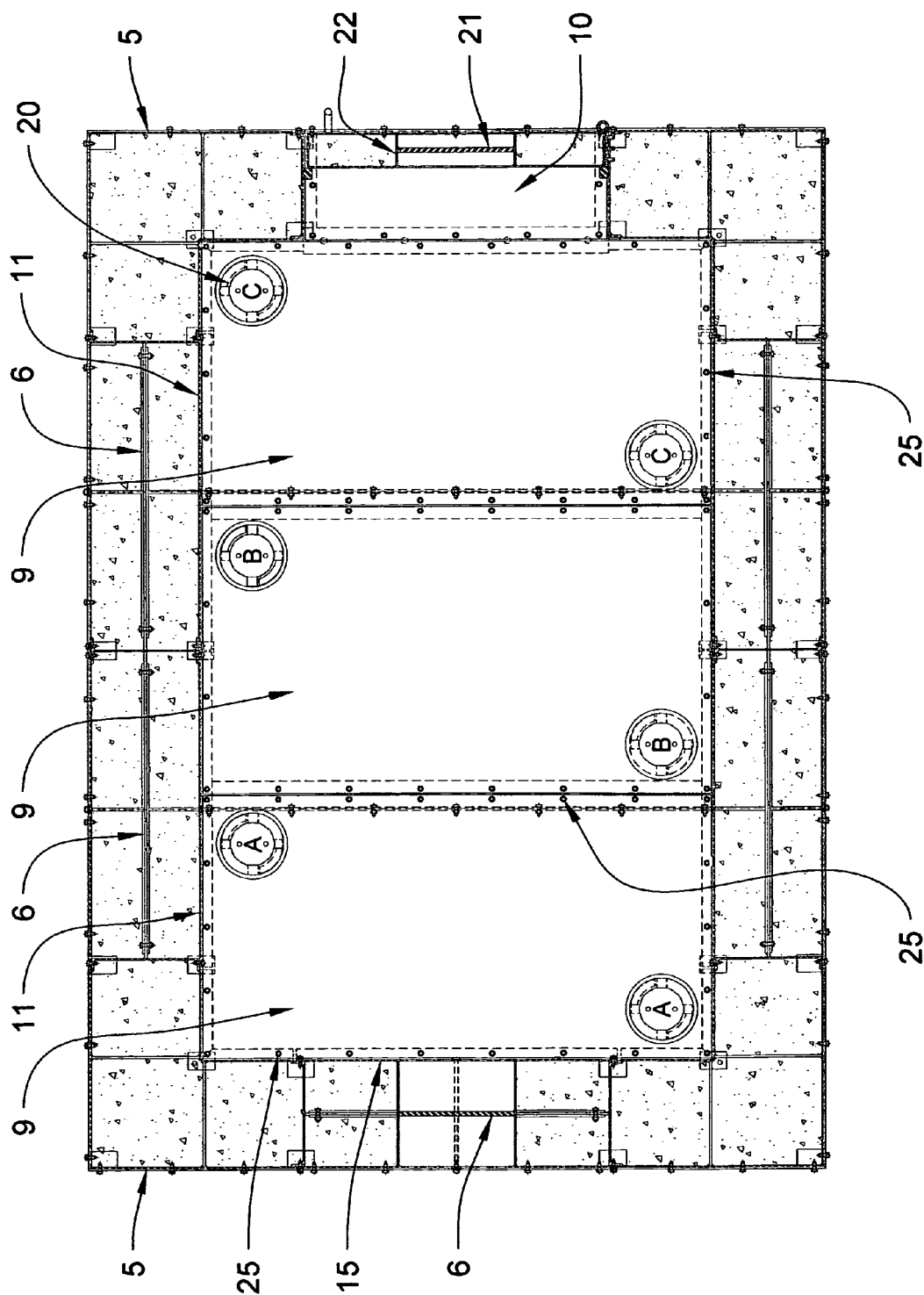

FIG.-6 Section View Taken at Cutting Plane 6-6 (See FIG.-5):
Floor plates (6) are secured on base plates (1, 2 & 3), interior wall plates (11 & 15) and corner weldments (5) utilizing self threading cap screws (25). ¼ turn plugs (20) are provided for filling empty cavities with concrete upon completion of assembly per FIG.-12.

Figure 7:
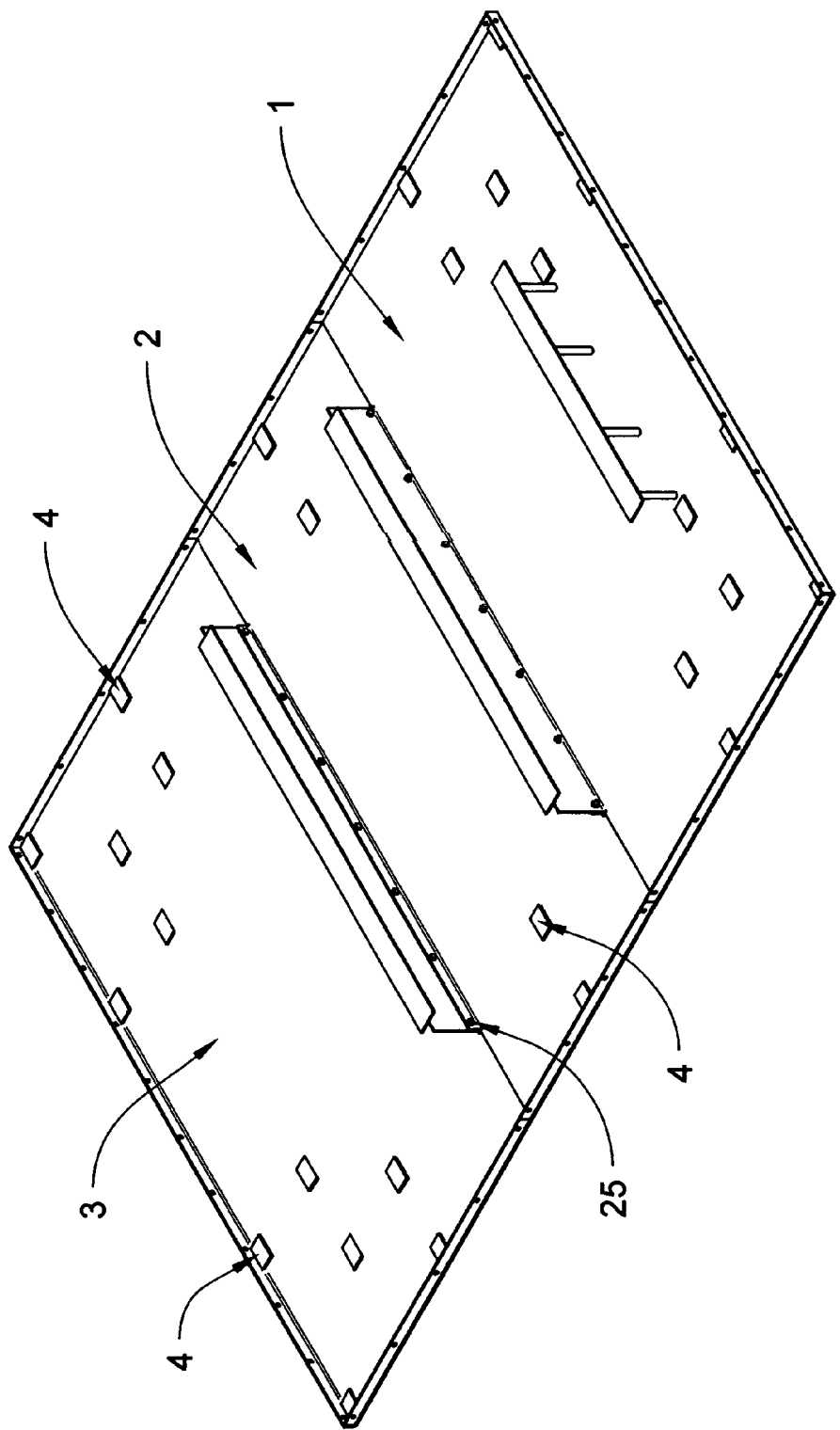

FIG.-7 Isometric View—Partially Assembled (Step 1):
Floor plate sub-weldments (1, 2 & 3) join to one another utilizing self threading cap screws (25). Spacer pads (4) are provided to elevate corners of mating plates to prevent interference with radius formed in bent plates.

Figure 8:
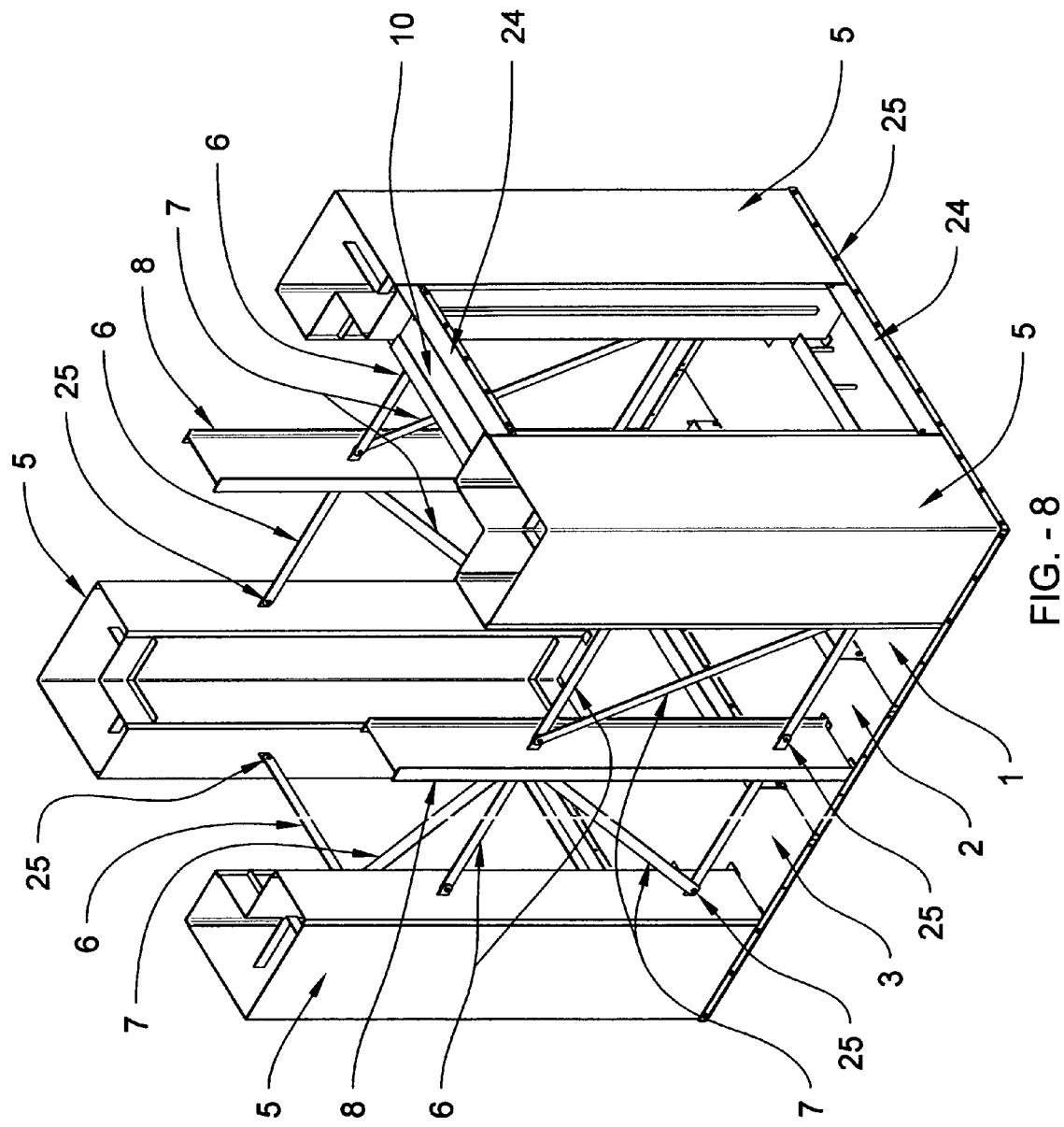

FIG.-8 Isometric View—Partially Assembled (Step 2):
Added components—corner sub-weldments (5), columns (8), braces (6 & 7), doorway ceiling plate (10), and doorway end plates (24) are fastened utilizing self threading cap screws (25).

Figure 9:
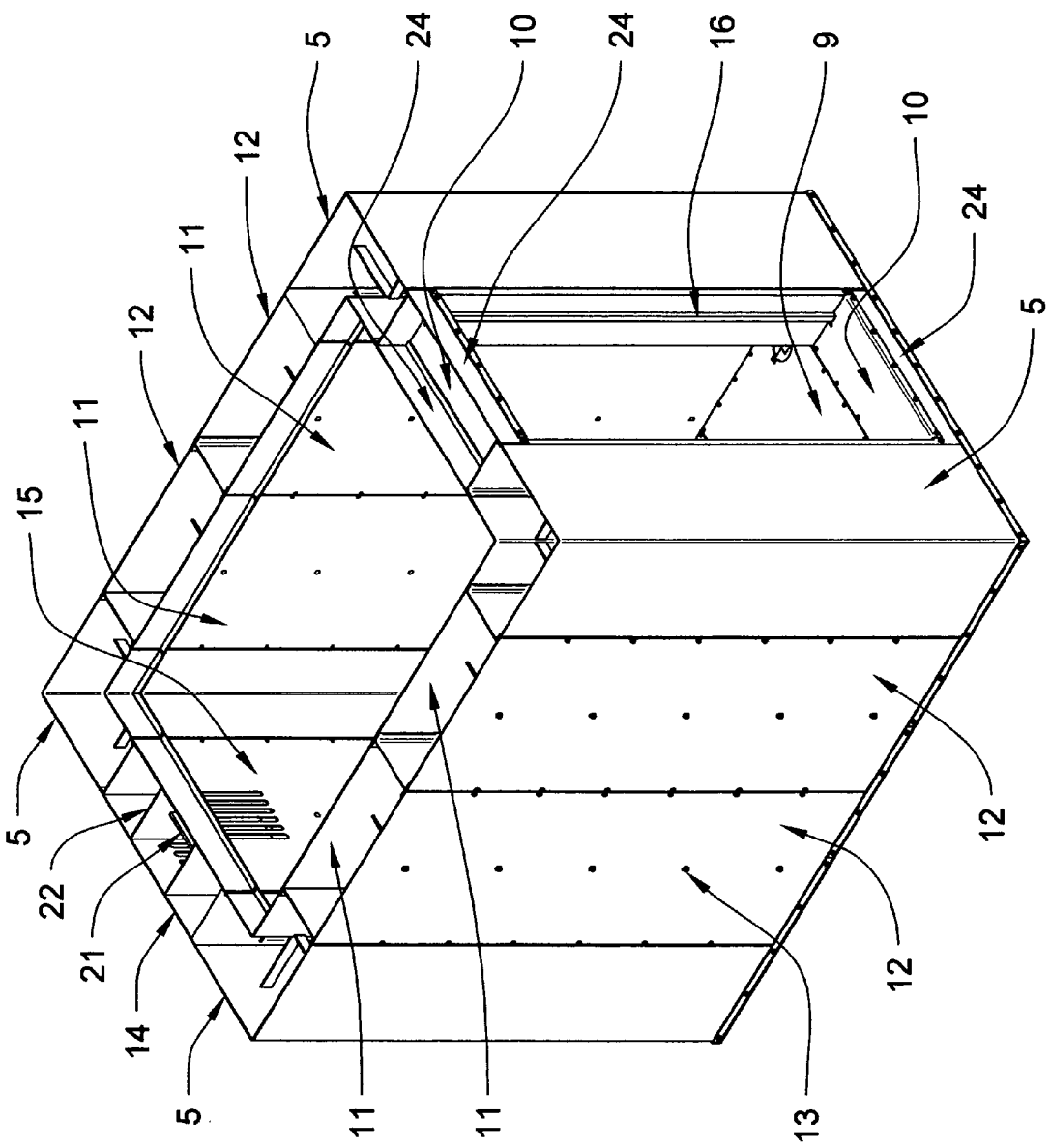

FIG.-9 Isometric View—Partially Assembled (Step 3):
Added components—interior wall plates (11, 12 & 15), exterior wall plates (12 & 14) and floor plates (9 & 10) are fastened utilizing self threading cap screws (25). Door stop bars (16) are attached to corners (5) preferably by welding, Clearance holes are provided in outside wall plates (12 & 14) and inside plates (11 & 15) to accept tension bolt/nut assembly (13) to minimize plate swellage during concrete filling.

Figure 10:
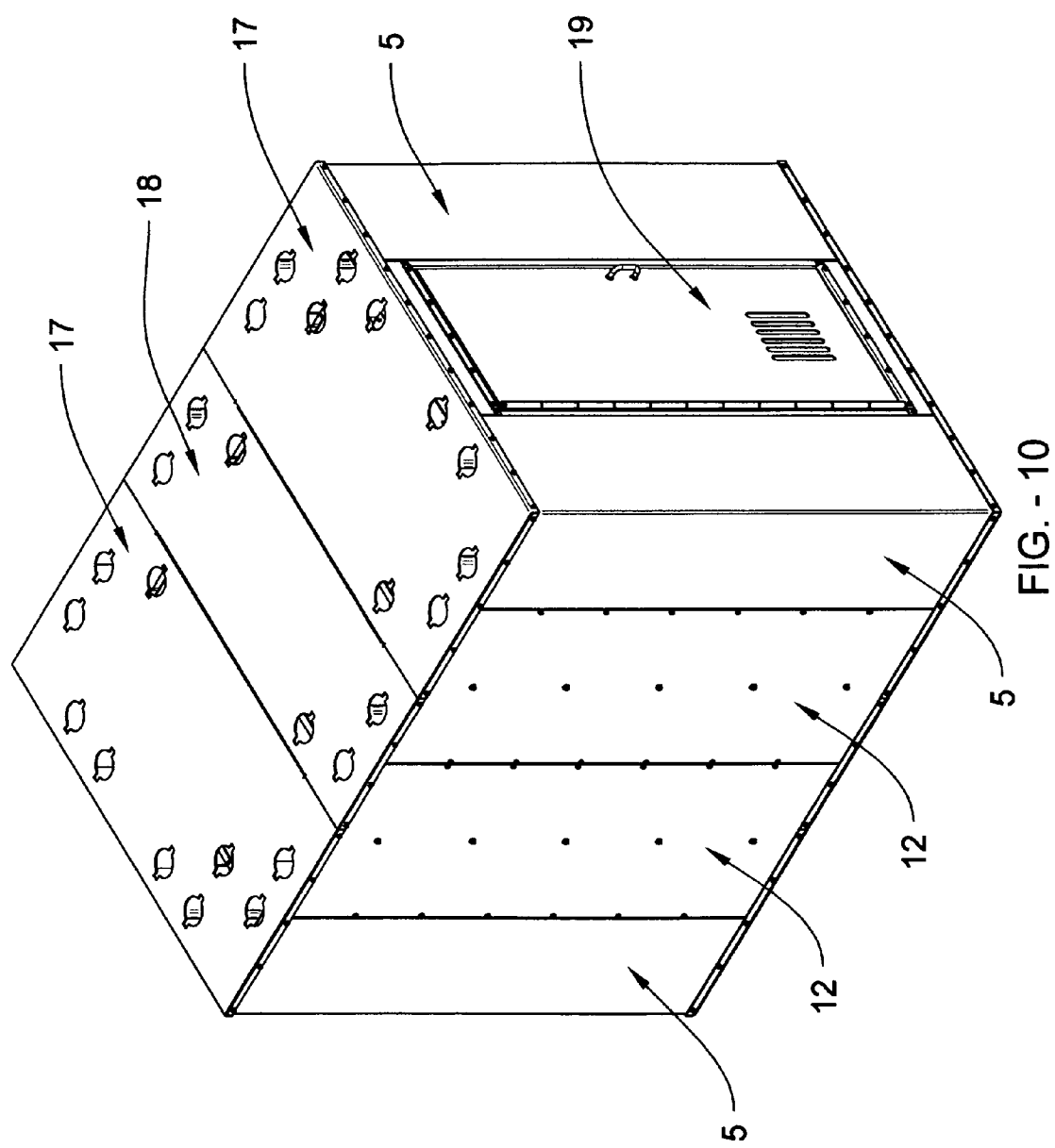

FIG.-10 Isometric View—Partially Assembled (Step 4):
Door (19) is hinge mounted on corner (5). Top plate sub-weldments (17 & 18) are fastened to each other and into structure utilizing self threading cap screws (25).

Figure 11:
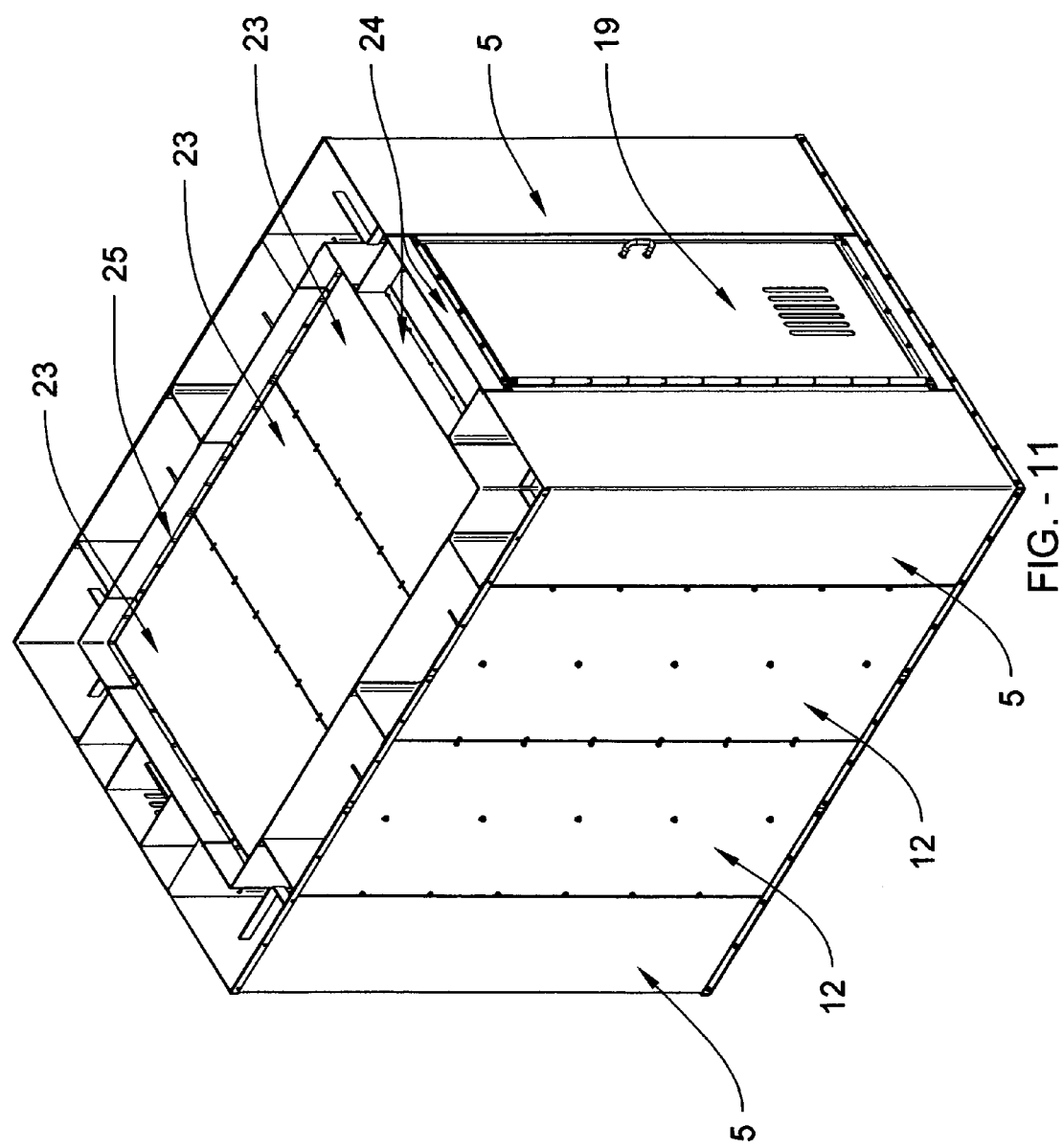

FIG.-11 Isometric View—Partially Assembled (Illustration Only):

Top plates (17 & 18) are omitted in this view for clarity. Ceiling plates (23) are fastened into structure utilizing self threading cap screws (25)

Figure 12:
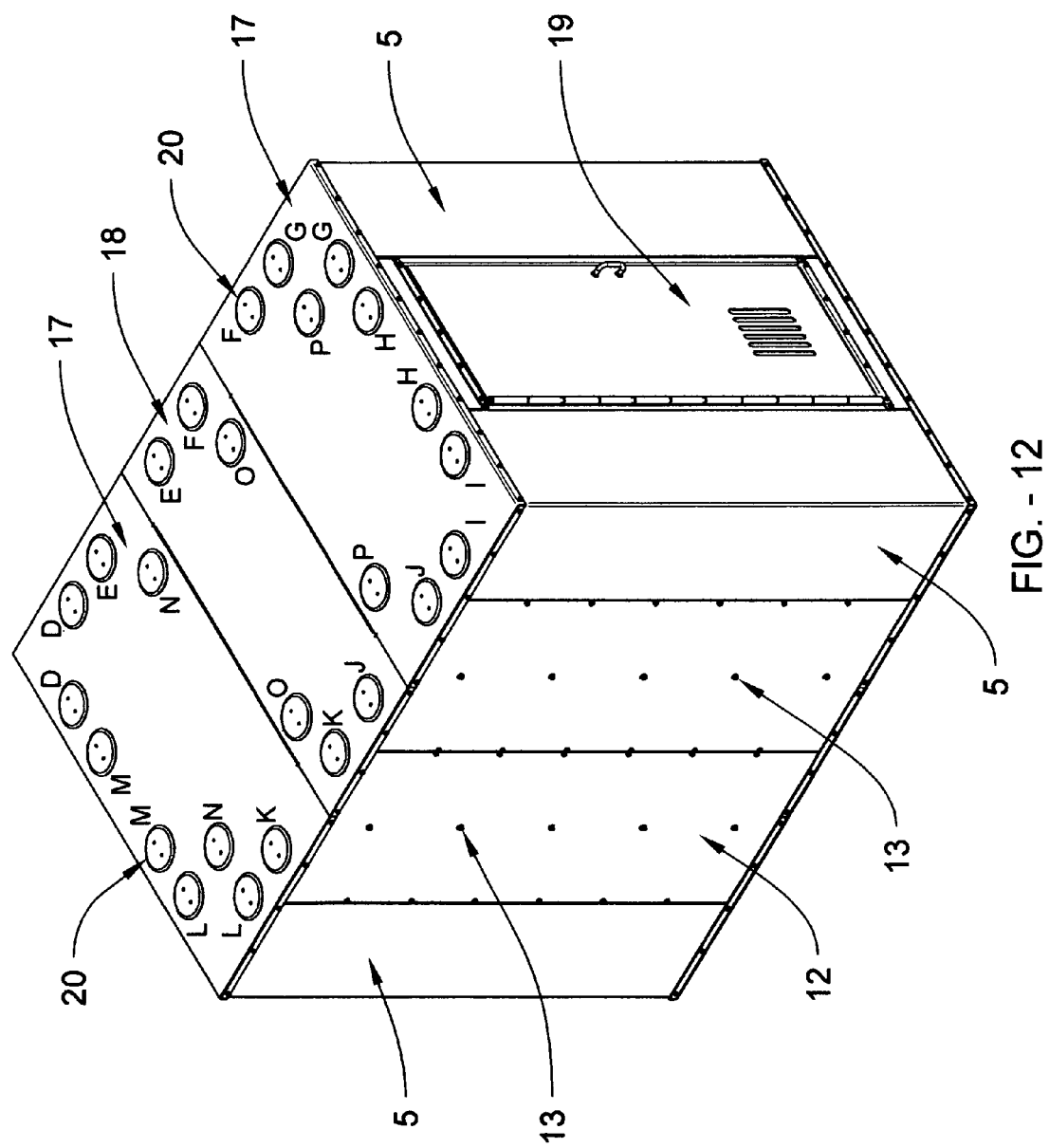

FIG.-12 Isometric View—Completely Assembled:

Structure at this stage is ready for concrete filling (preferably utilizing a concrete pumping machine and a concrete vibrator). Cavities to be filled would be filled in sequence as marked (I.E.—Both plugs marked "A" would be removed until concrete appears fully at both openings, then stop filling and replace plugs. Proceed to both plugs marked "B" and repeat sequence for all plugs until all cavities are filled.

What is claimed:

1. A structure for the protection of occupants comprising: prefabricated metal components to be assembled inside an existing structure, the prefabricated metal components being defined as four corners, two columns, interior and exterior floor plates, braces, interior and exterior wall plates, interior and exterior top plates, plugs, and at least one door, wherein the prefabricated components are assembled to form cavities and wherein the cavities are filled with concrete ballast material; wherein openings are provided for said plugs at select locations for filling and checking level of concrete ballast material in a prescribed order; ventilation in the at least one door and in at least one wall formed from said interior and exterior wall plates, wherein the ventilation is baffled and utilizes slots, wherein the door comprises a back plate as well as a baffle plate; and wherein the structure is adapted to be expanded in size by increasing the quantity of said prefabricated metal components.

* * * * *